(12) United States Patent
Negrel et al.

(10) Patent No.: US 12,497,154 B2
(45) Date of Patent: Dec. 16, 2025

(54) ASSEMBLY HAVING TWO ELEMENTS ASSEMBLED BY A GLUE JOINT PROVIDED WITH BLOCKED TUNNELS, VEHICLE COMPRISING SUCH AN ASSEMBLY AND METHODS FOR SECURING AND DETACHING SUCH AN ASSEMBLY

(71) Applicant: AIRBUS HELICOPTERS, Marignane (FR)

(72) Inventors: Florence Negrel, Aubagne (FR); Pierre Fruitet, Pompignan (FR); Olivier Bedus, Aurons (FR)

(73) Assignee: AIRBUS HELICOPTERS, Marignane (FR)

( * ) Notice: Subject to any disclaimer, the term of this patent is extended or adjusted under 35 U.S.C. 154(b) by 539 days.

(21) Appl. No.: 17/697,105

(22) Filed: Mar. 17, 2022

(65) Prior Publication Data

US 2022/0315199 A1 Oct. 6, 2022

(30) Foreign Application Priority Data

Mar. 30, 2021 (FR) ...................................... 2103286

(51) Int. Cl.
*B64C 1/14* (2006.01)
*F16B 11/00* (2006.01)

(52) U.S. Cl.
CPC .......... *B64C 1/1476* (2013.01); *B64C 1/1484* (2013.01); *B64C 1/1492* (2013.01); *F16B 11/006* (2013.01)

(58) Field of Classification Search
CPC ... B64C 1/1476; B64C 1/1484; B64C 1/1492; B32B 7/05; B60J 10/70

USPC ......................................................... 428/166
See application file for complete search history.

(56) References Cited

U.S. PATENT DOCUMENTS

| 4,876,132 A | 10/1989 | Kunert |
| 2003/0010867 A1* | 1/2003 | Wojatschek .......... B64C 1/1492 |
| | | 244/129.2 |
| 2005/0200163 A1 | 9/2005 | Arnold et al. |

(Continued)

FOREIGN PATENT DOCUMENTS

| EP | 0093283 A2 | 11/1983 |
| EP | 2610097 A1 | 7/2013 |

(Continued)

OTHER PUBLICATIONS

French Search Report for French Application No. FR2103286, Completed by the French Patent Office, Dated Dec. 13, 2021, 7 pages.

(Continued)

*Primary Examiner* — Catherine A. Simone
(74) *Attorney, Agent, or Firm* — BROOKS KUSHMAN P.C.

(57) ABSTRACT

An assembly provided with a panel glued by a glue joint to a support, the assembly facilitating the detachment of the panel from the support, the glue joint being interposed between an internal environment and an external environment. The assembly comprises at least one tunnel, each tunnel passing all the way through the glue joint along a transverse axis and connecting the internal environment and the external environment, each tunnel being reversibly blocked by a stopper.

20 Claims, 3 Drawing Sheets

(56) References Cited

U.S. PATENT DOCUMENTS

2013/0164074 A1   6/2013   Galant

FOREIGN PATENT DOCUMENTS

EP       3421350 B1   10/2020
FR       3068404 A1   1/2019

OTHER PUBLICATIONS

Canadian Examination Report for Canadian Patent Application No. 3,151,715, Completed by the Canadian Intellectual Property Office, Dated Jan. 31, 2024, 6 pages.
"Definitions: reversible," Larousse French Dictionary, Mar. 4, 2021, website: https://web.archive.org/web/20210304140924/https://www.larousse.fr/dictionnaires/francais/r%C3%A9versible/69119, accessed Apr. 4, 2024, 3 pages.
Canadian Examination Report for Canadian Patent Application No. 3,151,715, Completed by the Canadian Intellectual Property Office, dated Oct. 1, 2024, 5 pages.

* cited by examiner

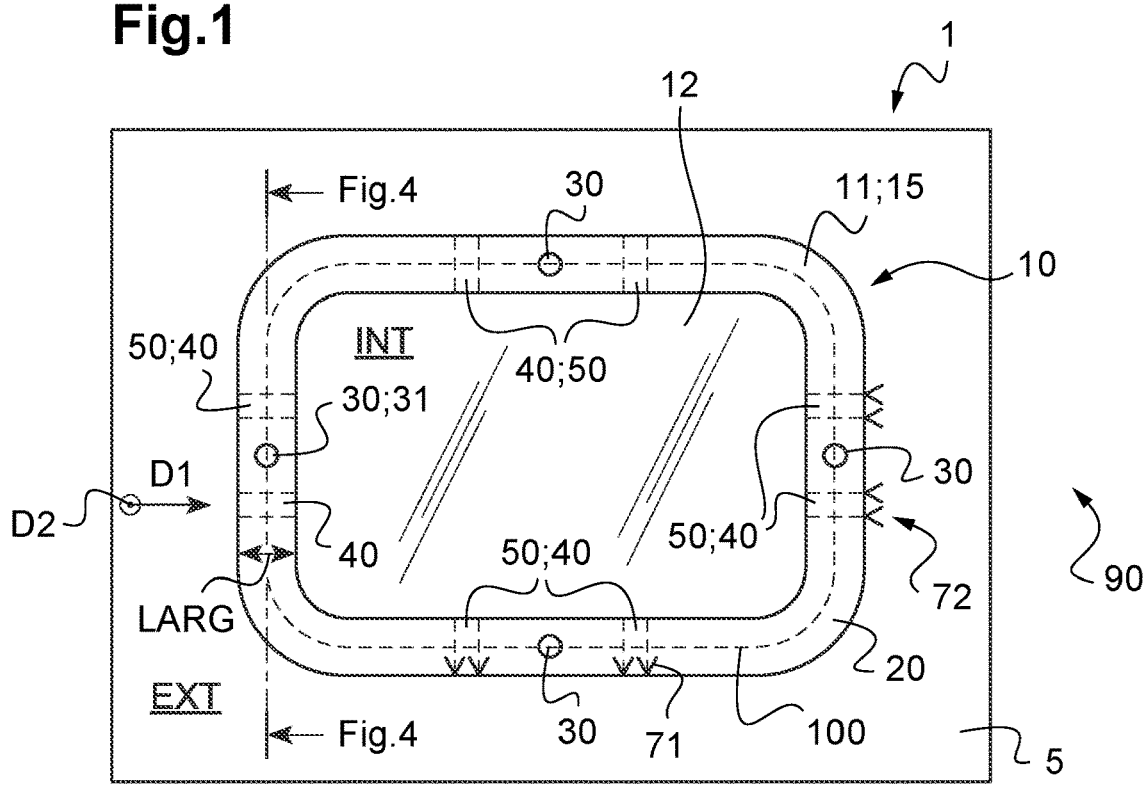
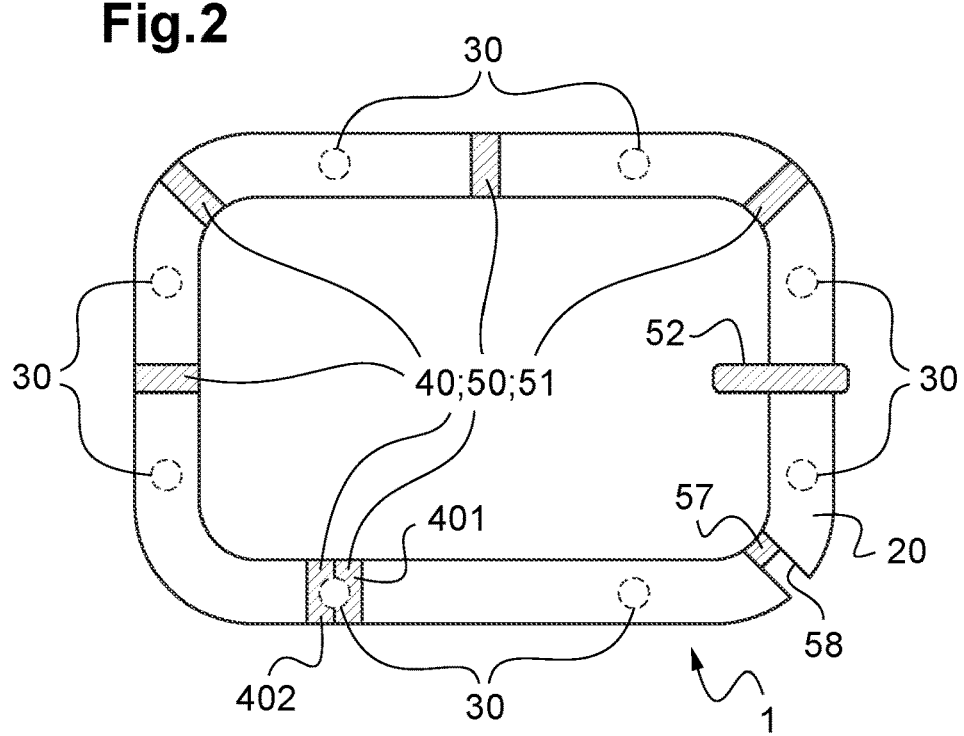

ASSEMBLY HAVING TWO ELEMENTS ASSEMBLED BY A GLUE JOINT PROVIDED WITH BLOCKED TUNNELS, VEHICLE COMPRISING SUCH AN ASSEMBLY AND METHODS FOR SECURING AND DETACHING SUCH AN ASSEMBLY

CROSS REFERENCE TO RELATED APPLICATIONS

This application claims priority to French patent application No. FR 21-03286 filed on Mar. 30, 2021, the disclosure of which is incorporated in its entirety by reference herein.

TECHNICAL FIELD

The present disclosure relates to an assembly having two elements assembled by a glue joint provided with blocked tunnels, as well as a vehicle comprising such an assembly and methods for securing and detaching such an assembly.

BACKGROUND

The disclosure relates in particular to the field of assemblies between a supporting structure of a vehicle and an element comprising an at least partially translucent or transparent panel, such as a windshield or a porthole. In particular, the vehicle may be an aircraft, the assembly being subjected to major mechanical and/or vibrational stresses.

Usually, a motor vehicle windshield can be fastened to a supporting structure of a vehicle by a glue joint. The glue joint can also make the connection airtight and watertight. In order to remove the glue joint, so as to replace the windshield, for example, this glue joint can be cut. A wire, sometimes referred to as "piano wire", is force-fitted into the glue joint and then moved in order to cut this glue joint. Another technique consists in inserting a vibrating knife between the windshield and the supporting structure in order to cut the glue joint.

On an aircraft subject to stresses that are not present in a motor vehicle, for example a difference in pressure between the internal and external spaces of the aircraft, the glue joint may be particularly strong. An aeronautical sealant referred to as "PR" made from liquid polysulfide rubber capable of polymerizing at room temperature may be used. The glue joints used in the aeronautical field may also have a large width in the region of two to ten centimeters and a small thickness in the region of three millimeters. This makes it difficult to position and use a vibrating knife or a wire to detach the panel from the supporting structure without damaging the supporting structure and/or the panel.

Moreover, the assembly may also include at least one obstacle that complicates the cutting of this glue joint. Such an obstacle may be in the form of a protrusion such as a spacer embedded in the glue joint. Furthermore, the glue joint may have a predetermined thickness that is advantageously substantially constant. The protrusion then extends at least partially into the thickness of the glue joint between the panel and the supporting structure of the vehicle, which is referred to hereinafter as the "support". Furthermore, a screw may tighten the panel against the protrusion by being screwed to this protrusion.

According to another example, an obstacle may be in the form of an irregular surface of the support or the windshield. Indeed, the supporting structure and the windshield may each comprise a non-planar zone comprising a pronounced curve with respect to other zones.

However, although such assemblies are very effective in resisting mechanical and/or vibratory stresses, replacing a panel may prove challenging. The presence of an obstacle, for example a curved zone or a protrusion embedded in the glue joint, is not compatible with conventional methods that allow a continuous cut to be made in the glue joint as described, in particular, in document EP 0 093 283.

Document EP 2 610 097 describes a reversible fastening device intended to be embedded in a glue joint. This fastening device comprises extraction wires passing through studs that form a set of protrusions.

Although effective, this fastening device requires the studs to be replaced once the glue joint has been cut. Moreover, the ends of the wires can be difficult to conceal.

Document FR 3 068 404 describes an assembly comprising a glue joint arranged at the interface between a first face of a frame and a second face of a support. The assembly comprises means for helping cut the glue joint comprising at least one elongate member arranged at least in the vicinity of and around an obstacle. The elongate member is partially embedded in the glue joint. The elongate member has two free ends emerging from the glue joint. These ends can be difficult to conceal. The elongate member may have at least one wire, or indeed a cable duct that receives the wire.

Document US 2005/0200163 also describes a system with an integrated cord.

SUMMARY

An object of the present disclosure is an innovative assembly intended to facilitate the removal of a panel. For example, such a panel may be a windshield or a partition.

The disclosure thus relates to an assembly provided with a panel as well as a glue joint and a support, the panel being glued by the glue joint to the support, said glue joint being interposed, for example but not necessarily in an airtight and watertight manner, between an internal environment and an external environment.

The assembly comprises at least one tunnel passing all the way through said glue joint along a transverse axis and connecting the internal environment and the external environment, each tunnel being completely blocked in a reversible manner by a stopper, for example in a watertight and airtight manner.

The expression "panel" may refer to a member comprising a wall, for example a translucent or transparent wall. This wall may comprise an edge glued to the support, or the panel may comprise a frame secured to the wall and provided with an edge glued to the support. In any event, an edge of the wall or of the frame, as the case may be, is thus glued to the support. Optionally, the edge of the panel may also additionally be tightened against protrusion-type obstacles by screws screwed into respective protrusions. In particular, the panel may be a windshield or a porthole. The panel is also located between the internal environment and the external environment.

For example, the glue joint comprises one or more sections. The adhesive section or sections may comprise a sealant, for example made from liquid polysulfide rubber capable of polymerizing at room temperature.

The assembly then comprises one or more tunnels. Irrespective of the number of tunnels, each tunnel is blocked by a stopper, which is not the case with a simple duct. Each stopper may be arranged in an elevated position in a space situated between the panel and the support, or may be in contact with the panel and/or the support. Each stopper may provide insulation against water and/or air, particularly in the case of a windshield.

The glue joint may therefore be continuous or discontinuous. In the case of a discontinuous glue joint, a tunnel may longitudinally separate two adhesive sections of the glue joint. In all cases, each tunnel is arranged within the glue joint, bringing the internal environment and the external environment into fluid communication through the glue joint between the support and the panel.

In normal conditions, the assembly remains intact, each tunnel being blocked by its stopper. If the panel needs to be removed, each stopper is removed by an operator. An operator can then easily insert a cutting member, such as a vibrating knife or a cutting wire, for example a "piano wire", through one or more tunnels. An operator can then manoeuvre the cutting member in order to cut the glue joint at least locally. The operator repeats the operation, if necessary.

The cutting member is not permanently arranged in the glue joint, but is introduced into a tunnel only during a detachment method, after removing a stopper.

The term "completely" means that the entire tunnel is blocked. The stopper may then insulate the internal environment against water and/or air with respect to the external environment.

This assembly therefore does not comprise a wire permanently arranged in the glue joint. This assembly does not comprise an end of a wire that can be moved in the internal environment or in the external environment and that is difficult to conceal. The assembly is thus discreet. Furthermore, the method is easy to implement and does not destroy the panel and the support.

The assembly may also comprise one or more of the following features.

According to one possibility, the assembly includes at least two said tunnels.

Therefore, during a detachment method, the same wire can enter the same tunnel several times in order to describe a loop around a portion of the glue joint so as to facilitate cutting. According to one possibility compatible with the preceding possibility, the assembly may have at least one obstacle, for example a curved zone or a protrusion arranged in the glue joint and extending according to an elevation axis between the panel and the support. The assembly may then comprise two said tunnels arranged to either side of the obstacle.

For example, a protrusion thus forms a stud allowing the panel to be positioned correctly with respect to the support. A protrusion may also help fasten the panel to the support, for example by cooperating with a screw.

According to another example, an obstacle may be in the form of a zone of the assembly comprising a pronounced curve relative to other zones of the assembly.

The assembly therefore comprises two tunnels around an obstacle, a protrusion or a zone with a pronounced curve, and not two ducts. This allows an operator to easily insert a cutting wire, for example a "piano wire", through the tunnels. In particular, the cutting wire may enter the two tunnels several times in order to describe a loop around an obstacle. An operator can therefore pull the cutting wire in a conventional manner in order to cut the glue joint locally. The operator repeats the operation for each obstacle.

Two tunnels may also be positioned next to a protrusion, or may surround a protrusion. The two tunnels then form a glue-free space around the protrusion in question. The tunnels can thus protect the protrusion. In particular, the tunnels may prevent glue residue from entering a screwing member screwed to the protrusion.

According to one possibility compatible with the preceding possibilities, the assembly may comprise several obstacles, each obstacle being arranged between two tunnels.

The glue joint can thus be cut easily around each obstacle.

According to one possibility, the glue joint may describe a closed line around said internal environment.

The glue joint can isolate the internal environment from the external environment, apart from the tunnels, in particular with respect to air and water.

According to one possibility compatible with the preceding possibility, at least one stopper, or indeed several stoppers or even each stopper, is of a first color, said glue joint being of a second color, said first color being different from the second color.

This enables an operator to easily identify where the stoppers are located.

According to one possibility compatible with the preceding possibilities, at least one stopper, or indeed several stoppers or even each stopper, comprises a closed-cell foam, said foam blocking a tunnel, said foam being able to be perforated by a piercing device.

The piercing device may optionally also be used to score the glue joint around the tunnel.

Foam may be arranged in each tunnel, and around a protrusion, as the case may be. Specifically, foam blocks may be inserted into the glue joint when the panel is secured to the support in order to form blocked tunnels.

As a result, the glue joint cannot fill cells of the foam. The foam can also be compressed. The foam may have a reduced height, in the region of 3 millimeters, for example. The foam may be self-adhesive in order to adhere to the support and/or to the panel.

For example, said foam comprises a polychloroprene-type material.

According to one possibility compatible with the preceding possibilities, at least one stopper, or indeed several stoppers or even each stopper, comprises a blocking pull stopper in the corresponding tunnel, said pull stopper extending at least partially, or even entirely, through the tunnel and at least into said internal or external environment.

Such a pull stopper is an elongate member that is pushed into a tunnel and that can be removed from the tunnel if necessary. Optionally, the pull stopper may be embedded in the glue joint during the installation of this glue joint. Such a pull stopper can easily be pulled out in order to insert a cutting wire or the like through the tunnels.

The pull stopper may optionally comprise a material from the silicone group.

The pull stopper may be in the form of a cylindrical tube blocking a tunnel.

Alternatively, the dimensions of the pull stopper may vary from the internal environment to the external environment in order to help hold it in the glue joint, even in the presence of vibrations. For example, the pull stopper may comprise a series of large-diameter sectors projecting outwards from small-diameter sectors. The pull stopper then has a series of bosses and recesses that help stabilize the pull stopper between the panel and the support.

The pull stopper may thus be sufficiently rigid to be extracted from the glue joint, and may be airtight and watertight.

According to one possibility compatible with the preceding possibilities, at least one stopper, or indeed several stoppers or even each stopper, comprises a plug arranged in a duct forming a said tunnel.

Such a plug may be arranged entirely inside the tunnel. An operator may then use a rod to push the plug out of the tunnel.

According to one possibility compatible with the preceding possibilities, the assembly may comprise a wire able to pass through at least one tunnel when the stopper is removed, the wire possibly being configured to form a loop and/or to be able to enter the same tunnel several times.

In normal conditions, the wire can be stored in a workshop. During a detachment operation, an operator can insert the wire through one or more tunnels in order to cut the glue joint. If required, the wire may form a loop around an obstacle by entering the same tunnel several times. In the case of a cylindrical tunnel, the wire may have a diameter at least less than half a diameter of the tunnel.

The same wire may be used to successively cut several sectors of the glue joint.

According to one possibility compatible with the preceding possibilities, at least one tunnel, or indeed several tunnels or even each tunnel, extends only in a straight line.

This makes it easy to insert a wire through a tunnel when required.

The at least one tunnel may extend along an axis at an acute or right angle to the glue joint. Therefore, the tunnel is locally perpendicular or substantially perpendicular to the glue joint.

According to one possibility compatible with the preceding possibilities, the support may comprise at least one locator designating a tunnel.

Thus, an operator knows precisely where a tunnel is located during the operation for detaching the panel, in particular in the presence of a foam stopper.

According to one possibility compatible with the preceding possibilities, the panel may comprise at least one mark designating a tunnel.

Thus, an operator knows precisely where a tunnel is located during the operation for detaching the panel, in particular in the presence of a foam stopper.

According to one possibility compatible with the preceding possibilities, the assembly may comprise a pattern to be arranged on said panel or said support, said pattern comprising at least one symbol designating a tunnel. The pattern may have at least one symbol per tunnel.

Thus, an operator knows precisely where a tunnel is located during the operation for detaching the panel, in particular in the presence of a foam stopper.

The same assembly may include at least one locator and/or at least one mark and/or pattern to identify one or more tunnels.

The disclosure also relates to a vehicle comprising such an assembly.

The panel comprises a transparent or translucent wall. Thus, the panel may be a windshield or a porthole.

Alternatively, the panel may be a solid panel. For example, the panel may be a partition defining two spaces.

The vehicle may be an aircraft.

The disclosure also relates to a method for securing a panel to a support of such an assembly, the method comprising the following step: arranging the or each stopper in a glue joint between the panel and the support, said glue joint extending between the panel and the support.

The disclosure also relates to a method for detaching a panel from a support of such an assembly, the method comprising the following steps: removing the or each stopper, inserting a cutting wire through at least one tunnel, and applying a force to the wire.

In particular, the cutting wire can be inserted through at least one tunnel at least twice in order to describe a loop around an obstacle before being pulled.

BRIEF DESCRIPTION OF THE DRAWINGS

The disclosure and its advantages appear in greater detail in the context of the following description of embodiments given by way of illustration and with reference to the accompanying figures, in which:

FIG. 1 is a top view of an assembly according to the disclosure, for example in a vehicle;

FIG. 2 is a representation depicting an assembly provided with a plurality of obstacles arranged between tunnels;

DETAILED DESCRIPTION

Figure 3:
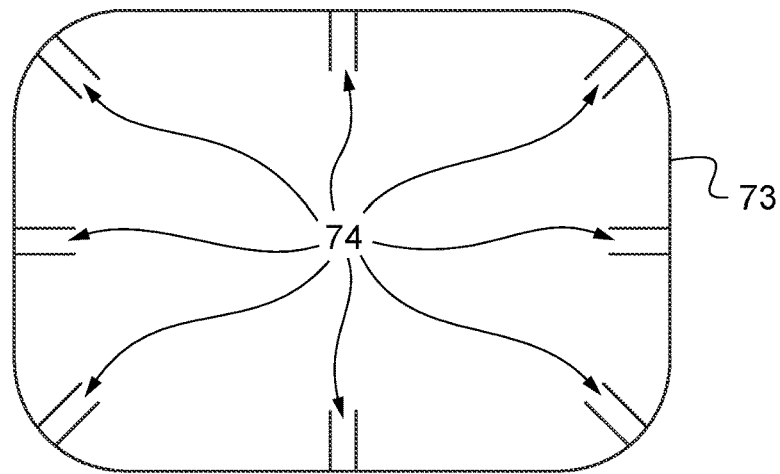
FIG. 3 is a representation of a pattern.

Elements that are present in more than one of the figures are given the same references in each of them.

FIG. 1 shows an assembly 1 according to the disclosure. This assembly 1 may be arranged in a vehicle 90 and, for example, in an aircraft, in particular an aircraft having a rotary wing.

The assembly 1 comprises a panel 10 and a support 5 to which the panel 10 is glued. The panel 10 may be configured to block an opening 6 of the support 5.

More specifically, the panel 10 may comprise a wall 12. This wall 12 may be transparent, translucent or solid. Optionally, the panel 10 is a windshield or a porthole. Optionally, the panel 10 comprises a frame 15 surrounding the wall 12.

The panel 10 may also comprise an edge 11 to be glued to the support 5. The edge 11 extends along a closed line 100. Depending on the variant, the edge 11 may be a part of the wall 12 or of the frame 15 of the panel 10.

In order to secure the panel 10 to the support 5, the assembly 1 comprises a glue joint 20 gluing the panel 10 to the support 5. Regardless of its actual nature, the whole of the panel 10 is rendered transparent in FIG. 1, in order to show the glue joint 20.

The glue joint 20 and the panel 10 are situated at the interface between a first environment, referred to for convenience as the "internal environment INT", and a second environment, referred to for convenience as the "external environment EXT". The panel 10 therefore comprises an inner face facing the internal environment INT and an outer face facing the external environment EXT. In the case of a vehicle 90, the glue joint 20 can separate an internal environment INT of the vehicle 90, for example a cabin, from the external environment EXT.

The glue joint 20 thus extends between the external environment EXT and the internal environment INT according to its width LARG and a transverse axis D1. The expression "transverse axis" denotes any axis extending from the external environment EXT to the internal environment INT, passing through the glue joint 20.

Figure 4:
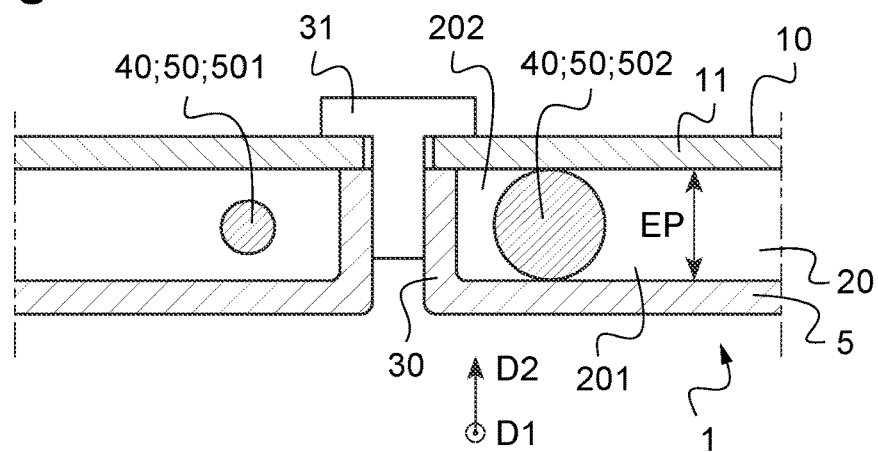
FIG. 4 is a partial cross-sectional view in elevation of an assembly according to the disclosure.

The glue joint 20 extends according to an elevation axis D2 between the support 5 and the panel 10, according to its thickness EP, shown in FIG. 4. The expression "elevation axis" denotes any axis extending from the support 5 to the panel 10, passing through the glue joint 20.

The glue joint 20 may extend along the closed line 100. For example, the glue joint 20 may extend over the entire edge 11. The glue joint 20 may comprise a material providing insulation, in particular, against air and water, such as sealant referred to as "PR", for example.

Furthermore, the assembly 1 may, according to the example shown, include at least one obstacle 30. For convenience, the figures show protrusion-type obstacles arranged in the glue joint 20. However, at least one zone of a support and/or of a convex panel also forms an obstacle. The term "obstacle" denotes an object or a part of an object forming an obstacle to the cutting of the glue joint.

Irrespective of the number of protrusions, each protrusion 30 extends according to an elevation axis D2 between the panel 10 and the support 5.

At least one or indeed several or even each protrusion 30 may be an integral part of the panel 10 or of the support 5. In addition to fastening by gluing, the panel 10 may also be tightened by screwing by means of a screw 31 screwed into a protrusion.

According to one example, a protrusion 30 may be integrated into the support 5. The glue joint 20 is then positioned on the support 5, and the panel 10 is pressed on so as to rest on the protrusion 30. A screw 31 is then screwed into a protrusion 30, the head of the screw 31 bearing against the outer face of the panel 10. The opposite is also possible, using a screw whose head bears against the support 5 and that is screwed into a protrusion integral with the panel 10.

Alternatively, the assembly 1 does not include protrusions 30.

According to another aspect, the assembly 1 includes at least one tunnel 40 formed in the glue joint 20, or even at least two tunnels 40 formed in the glue joint 20. At least one tunnel may separate two sections of the glue joint 20. The glue joint 20 is then discontinuous.

In the presence of an obstacle and, for example but not exclusively, a protrusion, two tunnels 40 may be arranged to either side of the obstacle 30, along the closed line 100 described by the glue joint.

According to the example shown in FIG. 1, each obstacle 30 is arranged between two tunnels 40 specific to it.

According to the example shown in FIG. 2, one tunnel 40 may be associated with two obstacles 30.

In both cases, each obstacle 30 is arranged between two tunnels 40.

According to one possibility, two tunnels may be joined by together surrounding a protrusion. Therefore, two tunnels 401, 402 can form a space surrounding a protrusion 301.

Irrespective of the embodiment, and with reference to FIG. 1, namely in the presence or absence of protrusions and, more generally, of obstacles 30, each tunnel 40 passes all the way through the glue joint 20 from the internal environment INT to the external environment EXT. Each tunnel 40 thus places the internal environment INT and the external environment EXT in fluid connection. Each tunnel 40 may extend only in a straight line in order to facilitate the passage of a wire described hereinafter. For example, at least one tunnel extends along an axis at a substantially right angle to the glue joint, and at a right angle according to FIG. 1.

In order to allow an operator to view the position of the tunnels 40, the support 5 may have at least one locator 72 designating a tunnel 40.

Alternatively, or additionally, the panel 10 may have at least one mark 71 designating a tunnel 40.

Alternatively, or additionally, and with reference to FIG. 3, the assembly 1 may comprise a pattern 73. The pattern 73 may be configured to be placed on the panel 10 or on the support 5 during a method for detaching the panel 10 from the support 5. This pattern 73 includes at least one symbol 74 designating at least one tunnel 40.

According to another aspect and with reference to FIG. 4, each tunnel 40 is blocked by a dedicated removable stopper 50. The term "removable" means that the stopper can be removed in order to leave the corresponding tunnel clear.

During a method for securing the panel 10 to the support 5, when the glue joint 20 is applied, each stopper 50 is positioned in the glue joint 20. A stopper 501 may be embedded in the glue joint. According to another example, a stopper 502 may be interposed between two sections 201, 202 of the glue joint, this stopper 502 extending in elevation from the support 5 up to the panel 10. This operation makes it possible, in one step, to obtain a tunnel 40 blocked by a stopper 50.

Fitting the stoppers 50 in the glue joint 20 can be a relatively easy operation, in particular when the tunnels 40 extend only in a straight line.

Furthermore, at least one stopper 50 may be of a first color different from a second color of the glue joint 20, so as to be easily identified. For example, the glue joint 20 comprises a black sealant, whereas a stopper 50 is orange.

The stoppers 50 are also made from materials that allow the tunnels 40 to be cleared during a detachment method. These materials are, for example, chosen so as not to be damaged by the glue joint 20 and so as to be able to be removed. These materials are also chosen so as not to damage the glue joint 20.

Figure 5:
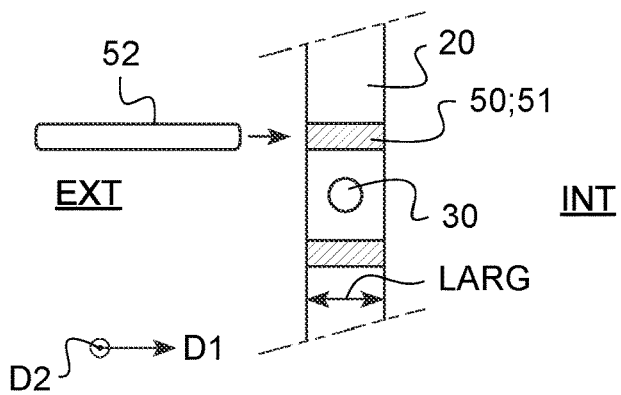
FIG. 5 is a partial cross-sectional view at the glue joint of an assembly according to the disclosure having a foam plug as seen from above.

According to the example shown in FIG. 5, a stopper may comprise a foam 51, for example closed-cell foam, providing insulation against air and water. Therefore, a foam stick or block 51 may be arranged in the glue joint 20 during the securing method. In this way, an operator obtains a tunnel 40 blocked by the foam 51. Optionally, the foam may extend only within the glue joint 20 or may comprise a section extending into the internal environment INT or into the external environment EXT.

During a detachment method, this foam 51 may be perforated with a piercing device 52 such as a spike, for example, in order to clear the tunnel.

Figure 6:
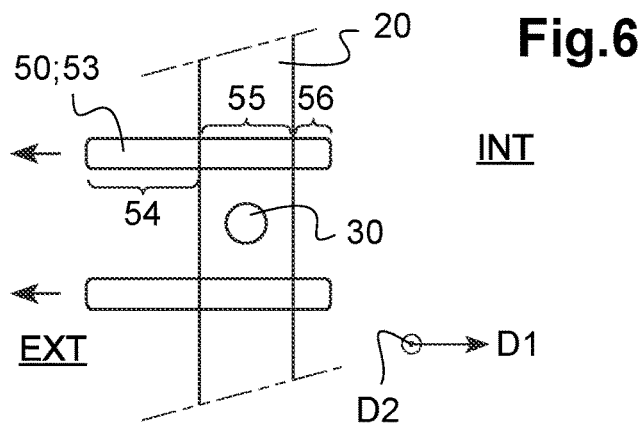
FIG. 6 is a partial cross-sectional view at the glue joint of an assembly according to the disclosure having a stopper comprising a pull stopper as seen from above.

According to the example shown in FIG. 6, at least one stopper 50 may comprise a pull stopper 53 blocking the corresponding tunnel 40.

The pull stopper 53 may be arranged in the glue joint 20 during the securing method. The pull stopper 53 comprises a central section 55 extending through a tunnel 40. The pull stopper 53 also comprises at least one external section 54 extending into the external environment EXT and/or an internal section 56 extending into the internal environment INT. Advantageously, the pull stopper 53 comprises an internal section 56 that is not visible from the external environment EXT.

During a detachment method, an operator can take hold of the external section 54 or the internal section 56 in order to apply a force to the pull stopper 53 to extract it from the tunnel 40.

Figure 7:
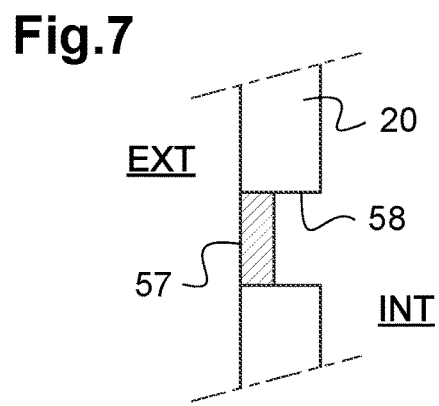
FIG. 7 is a partial cross-sectional view at the glue joint of an assembly according to the disclosure having a stopper comprising a plug as seen from above.

According to the example shown in FIG. 7, at least one stopper 50 may comprise a duct 58 passing through the glue joint. A plug 57 is then inserted into the duct 58.

On the same assembly, at least one stopper 50 may comprise foam 51, at least one other stopper 50 may comprise a pull stopper 53 and/or at least one other stopper 50 may comprise a plug 57.

Figure 8:
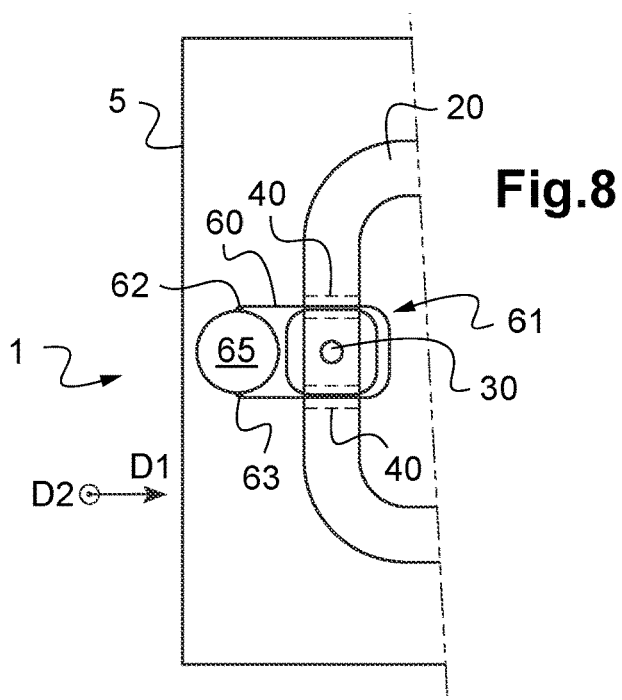
FIG. 8 is a representation depicting a detachment method.

Furthermore, and with reference to FIG. 8, the assembly 1 may comprise a wire 60, for example a piano wire. The wire is not arranged between the support and the panel, except during a detachment phase.

During the detachment method, each tunnel 40 is freed of its stopper 50, by using a piercing device in the case of a foam stopper 51 or by pulling or pushing on the pull stopper 53, as the case may be.

The wire 60 is then inserted through a tunnel 40 so as to pass through the glue joint 20 from the external environment EXT to the internal environment INT. For example, a needle may be used to insert the wire 60 into a tunnel 40 and pass it through the tunnel 40.

Optionally, one or two operators can take hold of the two ends 62, 63 of the wire 60 in order to move it and cut through the glue joint 20.

However, the operator can also insert the wire 60 through another tunnel 40 so that the two ends 62, 63 are located either in the internal environment INT or in the external environment EXT. The operator can then either apply forces to the ends 62, 63 or attach the ends 62, 63 to a conventional tool 65, such as a winder, for example, in order to pull on the wire 60 and cut through the glue joint 20.

Optionally, and according to the example shown, each tunnel 40 may be configured to be able to accommodate several wires 60 or the same wire 60 several times. The wire 60 may thus describe a loop 61 around the glue joint 20 and, if appropriate, around an obstacle 30. Such a loop 61 helps facilitate the cutting of the glue joint 20.

This operation may be carried out several times in order to cut the entire glue joint 20.

Naturally, the present disclosure is subject to numerous variations as regards its implementation. Although several embodiments are described above, it should readily be understood that it is not conceivable to identify exhaustively all the possible embodiments. It is naturally possible to envisage replacing any of the means described by equivalent means without going beyond the ambit of the present disclosure.

What is claimed is:

1. An assembly provided with a panel as well as a glue joint and a support, the panel being glued by the glue joint to the support, the glue joint being interposed along an elevation axis between an internal environment and an external environment,
wherein the assembly comprises at least one tunnel extending transverse to the elevation axis and passing all the way through the glue joint and connecting the internal environment and the external environment, each tunnel being completely blocked in a reversible manner by a stopper.

2. The assembly according to claim 1,
wherein the assembly comprises at least two tunnels.

3. The assembly according to claim 2,
wherein the assembly has at least one obstacle, the assembly including two tunnels arranged to either side of the obstacle(s).

4. The assembly according to claim 3,
wherein the assembly comprises several obstacles, each obstacle being arranged between two tunnels.

5. The assembly according to claim 1,
wherein the glue joint describes a closed line around the internal environment.

6. The assembly according to claim 1,
wherein at least one stopper is of a first color, the glue joint is of a second color, the first color being different from the second color.

7. The assembly according to claim 1,
wherein at least one stopper comprises a closed-cell foam, the foam blocking a tunnel.

8. The assembly according to claim 1,
wherein at least one stopper comprises a pull stopper blocking the corresponding tunnel, the pull stopper extending at least partially through the tunnel and at least into the internal or external environment.

9. The assembly according to claim 1,
wherein at least one stopper comprises a plug arranged in a duct forming a tunnel.

10. The assembly according to claim 1,
wherein the assembly comprises a wire able to pass through the at least one tunnel when the stopper is removed, the wire being configured so as to be able to enter the same tunnel several times.

11. The assembly according to claim 1,
wherein the at least one tunnel extends only in a straight line.

12. The assembly according to claim 1,
wherein the at least one tunnel extends along an axis at an acute or right angle to the glue joint.

13. The assembly according to claim 1,
wherein the support comprises at least one locator designating the at least one tunnel or at least one mark designating the at least one tunnel, or a pattern to be arranged on the panel or the support, the pattern comprising at least one symbol designating the at least one tunnel.

14. A vehicle comprising an assembly,
wherein the assembly is according to claim 1.

15. The vehicle according to claim 14,
wherein the panel comprises a transparent or translucent wall.

16. The vehicle according to claim 14,
wherein the vehicle is an aircraft.

17. A method for securing a panel to a support of the assembly according to claim 1, the method comprising the following step: arranging the stopper in a glue joint between the panel and the support, the glue joint extending between the panel and the support.

18. The method for detaching a panel from a support of the assembly according to claim 1, the method comprising the following steps: removing the stopper, inserting a wire through the at least one tunnel, and applying a force to the wire.

19. The assembly according to claim 1,
wherein the glue joint has a width extending between the external environment and the internal environment along a transverse axis extending from the external environment to the internal environment.

20. The assembly according to claim 1, wherein the glue joint has a thickness extending along an elevation axis between the support and the panel.

\* \* \* \* \*